US 8,339,540 B2

(12) United States Patent
Fujimoto et al.

(10) Patent No.: US 8,339,540 B2
(45) Date of Patent: Dec. 25, 2012

(54) LIQUID CRYSTAL DISPLAY APPARATUS COMPRISING A REFLECTION SHEET HAVING A HIGHER DEGREE OF FREEDOM OF MOVEMENT IN A DIRECTION ALONG ITS SURFACE

(75) Inventors: Makoto Fujimoto, Chiba (JP); Hiroshi Obata, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 34 days.

(21) Appl. No.: 13/114,749

(22) Filed: May 24, 2011

(65) Prior Publication Data

US 2011/0292316 A1    Dec. 1, 2011

(30) Foreign Application Priority Data

May 27, 2010  (JP) ................................. 2010-121702

(51) Int. Cl.
*G02F 1/1335* (2006.01)
*G09F 13/08* (2006.01)
(52) U.S. Cl. .............................. 349/67; 349/69; 362/97.3
(58) Field of Classification Search .............. 349/61–64, 349/67, 69; 362/97.1–97.4, 249.02, 311.02, 362/545, 555, 800
See application file for complete search history.

(56) References Cited

U.S. PATENT DOCUMENTS

| | | | |
|---|---|---|---|
| 2006/0279671 A1* | 12/2006 | Han et al. | 349/61 |
| 2007/0064171 A1* | 3/2007 | Moriyasu et al. | 349/61 |
| 2008/0049164 A1* | 2/2008 | Jeon et al. | 349/61 |
| 2008/0219003 A1* | 9/2008 | Park | 362/247 |
| 2008/0309846 A1* | 12/2008 | Hong | 349/64 |

FOREIGN PATENT DOCUMENTS

JP    2009-087879    4/2009

* cited by examiner

*Primary Examiner* — Mark Robinson
*Assistant Examiner* — Paul Lee
(74) *Attorney, Agent, or Firm* — Hamre, Schumann, Mueller & Larson, P.C.

(57) ABSTRACT

A reflection sheet is made of material having a coefficient of thermal expansion different from that of an LED substrate. A fixing member and a retaining member extend through the reflection sheet and the LED substrate so as to fix the reflection sheet and the LED substrate. The reflection sheet includes a fixing hole into which the fixing member is inserted, a retaining hole into which the retaining member is inserted, and LED holes within which light emitting diodes are disposed, respectively. Retaining of the reflection sheet by the retaining member has, compared to fixing of the reflection sheet by the fixing member, a higher degree of freedom of movement in a direction along a surface of the reflection sheet. The LED holes located in positions far from the fixing hole are larger than the LED holes located in positions close to the fixing hole.

12 Claims, 5 Drawing Sheets

LIQUID CRYSTAL DISPLAY APPARATUS COMPRISING A REFLECTION SHEET HAVING A HIGHER DEGREE OF FREEDOM OF MOVEMENT IN A DIRECTION ALONG ITS SURFACE

CROSS-REFERENCE TO RELATED APPLICATION

The present application claims priority from Japanese application JP 2010-121702 filed on May 27, 2010, the content of which is hereby incorporated by reference into this application.

BACKGROUND OF THE INVENTION

1. Field of the Invention

The present invention relates to a liquid crystal display apparatus.

2. Description of the Related Art

It is known to use a plurality of light emitting diodes arranged in matrix for a backlight of a liquid crystal display apparatus (Japanese Patent Application Laid-open No. 2009-87879). The backlight has such a configuration that a reflection sheet is placed on a substrate having the light emitting diodes mounted thereon, and the light emitting diodes are disposed in holes formed in the reflection sheet, to thereby reflect the light by the reflection sheet.

The reflection sheet is in many cases made of a resin, and hence the reflection sheet is prone to expand and contract due to heat. Therefore, the holes formed in the reflection sheet may be displaced from positions of the light emitting diodes, in which case, there is a problem in that the light emitting diodes are hidden by the reflection sheet and luminance of the backlight is reduced. In order to deal with this problem, it is possible to increase the size of the holes collectively so as to prevent the light emitting diodes from being hidden even in the case of expansion and contraction of the reflection sheet. However, the larger holes make a reflective area smaller, thereby reducing the luminance of the backlight.

SUMMARY OF THE INVENTION

The present invention aims to prevent reduction in luminance due to expansion and contraction of a reflection sheet.

(1) A liquid crystal display apparatus according to the present invention includes: a liquid crystal display panel; a plurality of light emitting diodes serving as backlight light sources of the liquid crystal display panel; an LED substrate on which the plurality of light emitting diodes are mounted; a reflection sheet made of a material having a coefficient of thermal expansion different from a coefficient of thermal expansion of the LED substrate and overlaid on a surface of the LED substrate on which the plurality of light emitting diodes are mounted; and a fixing member and a retaining member which extend through the reflection sheet and the LED substrate so as to fix the reflection sheet and the LED substrate to each other, in which: the reflection sheet includes a fixing hole into which the fixing member is inserted, a retaining hole into which the retaining member is inserted, and a plurality of LED holes within which the plurality of light emitting diodes are disposed, respectively; retaining of the reflection sheet by the retaining member has, compared to fixing of the reflection sheet by the fixing member, a higher degree of freedom of movement in a direction along a surface of the reflection sheet; and the plurality of LED holes located in positions far from the fixing hole are larger than the plurality of LED holes located in the positions close to the fixing hole. According to the present invention, in positions close to the fixing hole, the LED holes are close to the fixing member, and hence a displacement amount of the LED holes is small even in the case of expansion and contraction of the reflection sheet. Thus, the light emitting diodes are accommodated within the LED holes even when the LED holes are small in those positions. On the other hand, in the positions far from the fixing holes, the LED holes are far from the fixing member, and hence the displacement amount of the LED holes becomes larger in the case of expansion and contraction of the reflection sheet. However, because the LED holes are large in those positions so that the light emitting diodes are not hidden by the reflection sheet. Thus, it is possible to prevent reduction in luminance due to expansion and contraction of the reflection sheet.

(2) In the liquid crystal display apparatus as described in the item (1) of the invention, the fixing hole may be located in a position closer to a center of the reflection sheet compared to the retaining hole.

(3) In the liquid crystal display apparatus as described in the item (2) of the invention, the fixing hole may include a plurality of fixing holes, the plurality of fixing holes being formed in a central region of the reflection sheet, and the retaining hole may include a plurality of retaining holes, the plurality of retaining holes being formed in an end region of the reflection sheet.

(4) In the liquid crystal display apparatus as described in the item (3) of the invention, the LED substrate is divided into a plurality of divided substrates, each of the plurality of divided substrates may include a first through-hole brought into communication with the fixing hole and a second through-hole brought into communication with the retaining hole, and the plurality of divided substrates may be arranged so that the first through-holes are close to one another and the second through-holes are apart from one another.

(5) In the liquid crystal display apparatus as described in any one of the items (1) to (4) of the invention, a clearance between the fixing hole and the fixing member may be smaller than a clearance between the retaining hole and the retaining member.

(6) In the liquid crystal display apparatus as described in any one of the items (1) to (5) of the invention, the fixing member may be fitted so as to clamp the reflection sheet and the LED substrate, and the retaining member may be fitted so as not to apply any pressing force between the reflection sheet and the LED substrate.

(7) In the liquid crystal display apparatus as described in any one of the items (1) to (6) of the invention, the retaining hole may be elongated in a direction of thermal expansion of the reflection sheet.

(8) In the liquid crystal display apparatus as described in any one of the items (1) to (7) of the invention, at least one of the plurality of LED holes may be elongated in the direction of thermal expansion of the reflection sheet.

DETAILED DESCRIPTION OF THE INVENTION

Figure 1:
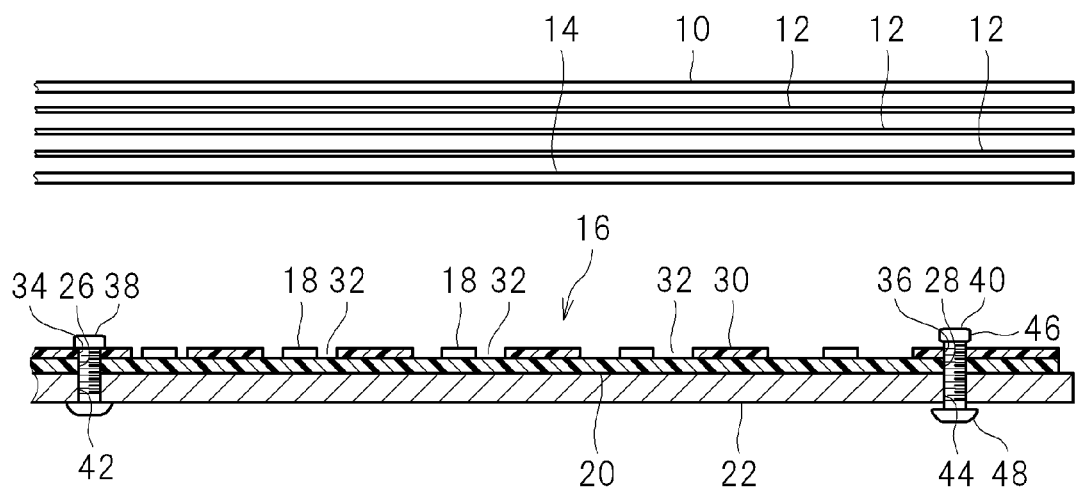
FIG. 1 is a sectional view illustrating a liquid crystal display apparatus according to an embodiment of the present invention.

Hereinafter, an embodiment of the present invention is described with reference to the accompanying drawings. FIG. 1 is a sectional view illustrating a liquid crystal display apparatus according to the embodiment of the present invention.

The liquid crystal display apparatus includes a liquid crystal display panel 10. A plurality of optical sheets 12 are disposed on the opposite side (lower side in FIG. 1) of a display surface (upper surface in FIG. 1) of the liquid crystal display panel 10. A diffusion plate 14 is disposed under the plurality of optical sheets 12. The liquid crystal display apparatus includes a back light 16. The optical sheets 12 and the diffusion plate 14 are disposed between the liquid crystal display panel 10 and the backlight 16. The diffusion plate 14 is disposed on a side close to the backlight 16, whereas the optical sheets 12 are disposed on a side close to the liquid crystal display panel 10.

Figure 2:
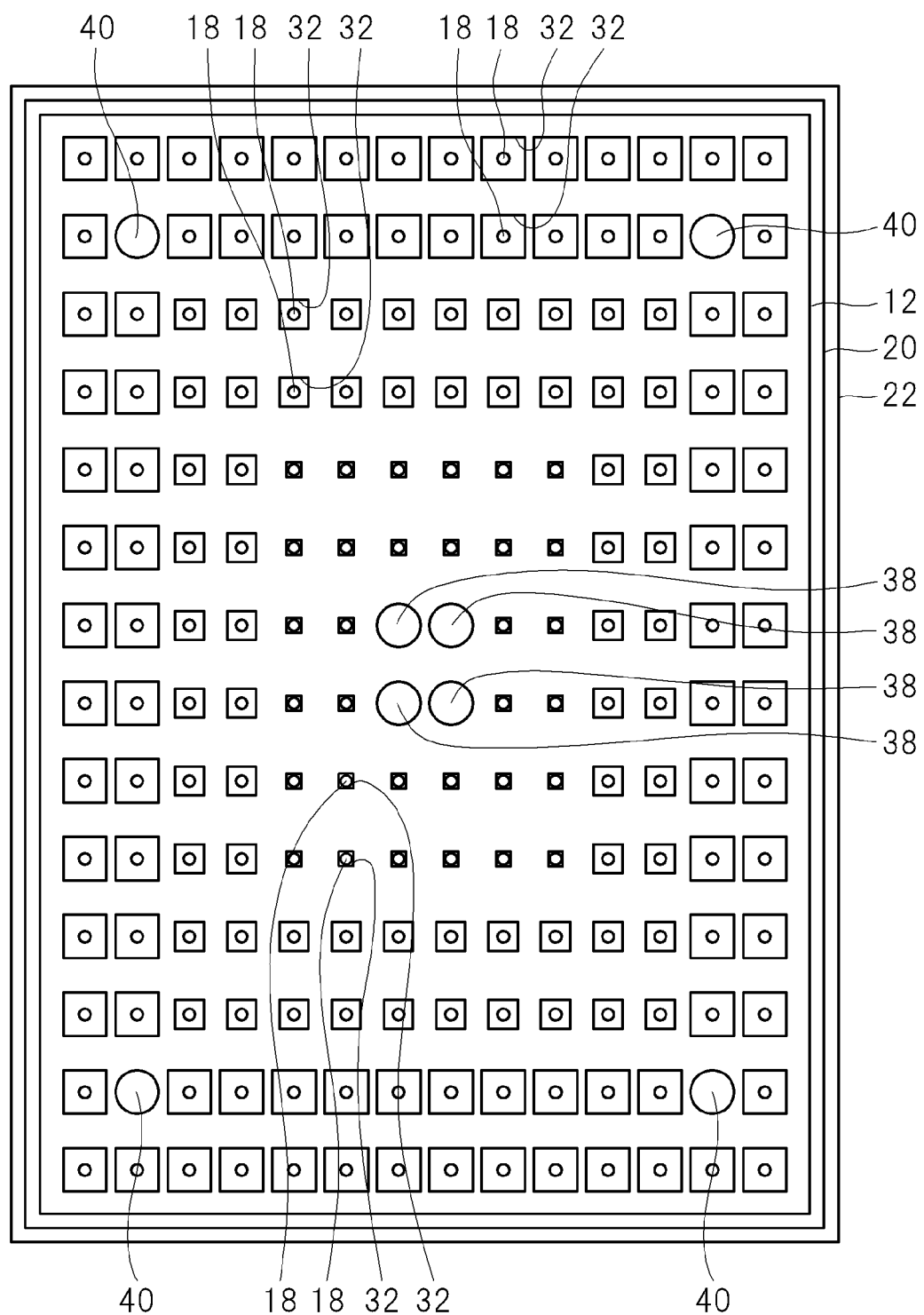
FIG. 2 is a plan view illustrating a structure below a diffusion plate of the liquid crystal display apparatus according to the embodiment of the present invention.

FIG. 2 is a plan view illustrating a structure below the diffusion plate 14 of the liquid crystal display apparatus according to the embodiment of the present invention. The liquid crystal display apparatus includes a plurality of light emitting diodes 18 serving as backlight light sources of the liquid crystal display panel 10. The plurality of light emitting diodes 18 are two-dimensionally arrayed (for example, in a plurality of rows and columns). The plurality of light emitting diodes 18 are mounted on a light emitting diode (LED) substrate 20 made of a material such as a glass epoxy resin. A frame 22 is disposed under the LED substrate 20. The LED substrate 20 is intended to be a substrate on which the light emitting diodes 18 are mounted.

Figure 3:
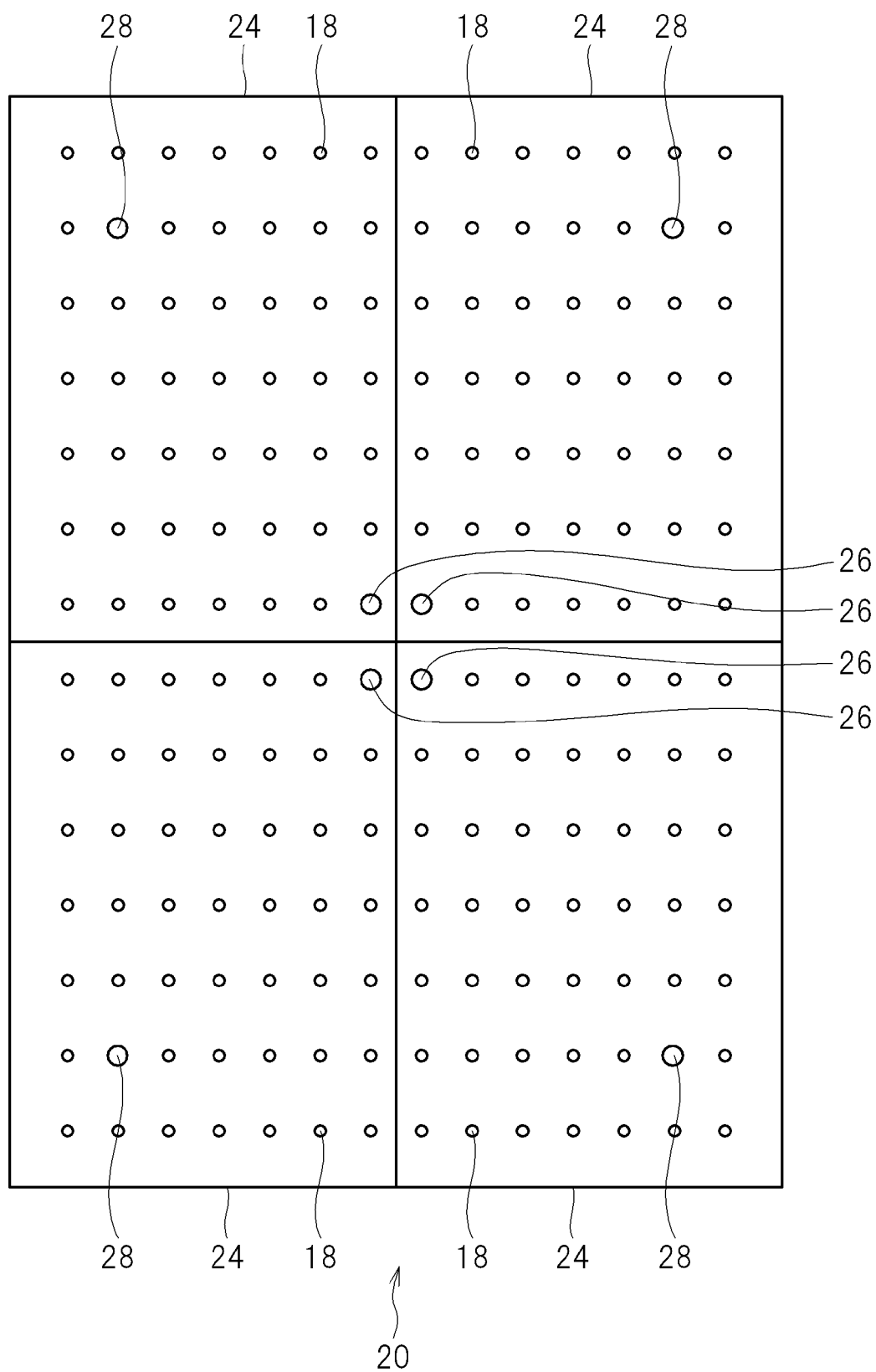
FIG. 3 is a plan view illustrating an LED substrate of the liquid crystal display apparatus according to the embodiment of the present invention.

FIG. 3 is a plan view illustrating the LED substrate 20 of the liquid crystal display apparatus according to the embodiment of the present invention. The LED substrate 20 is divided into a plurality of divided substrates 24. Each of the divided substrates 24 forming the LED substrate 20 includes a first through-hole 26 and a second through-hole 28 formed therein. The plurality of divided substrates 24 are arranged so that the first through-holes 26 are close to one another and the second through-holes 28 are apart from one another.

As illustrated in FIG. 1, a reflection sheet 30 is overlaid on a surface of the LED substrate 20 on which the plurality of light emitting diodes 18 are mounted. The reflection sheet 30 includes a plurality of LED holes 32 formed therein, and each of the plurality of light emitting diodes 18 are disposed within each of the plurality of LED holes 32. A planar shape of the LED holes 32 may be rectangular, circular, or oval. The LED holes 32 are intended to be holes within which the light emitting diodes 18 are disposed.

Figure 4:
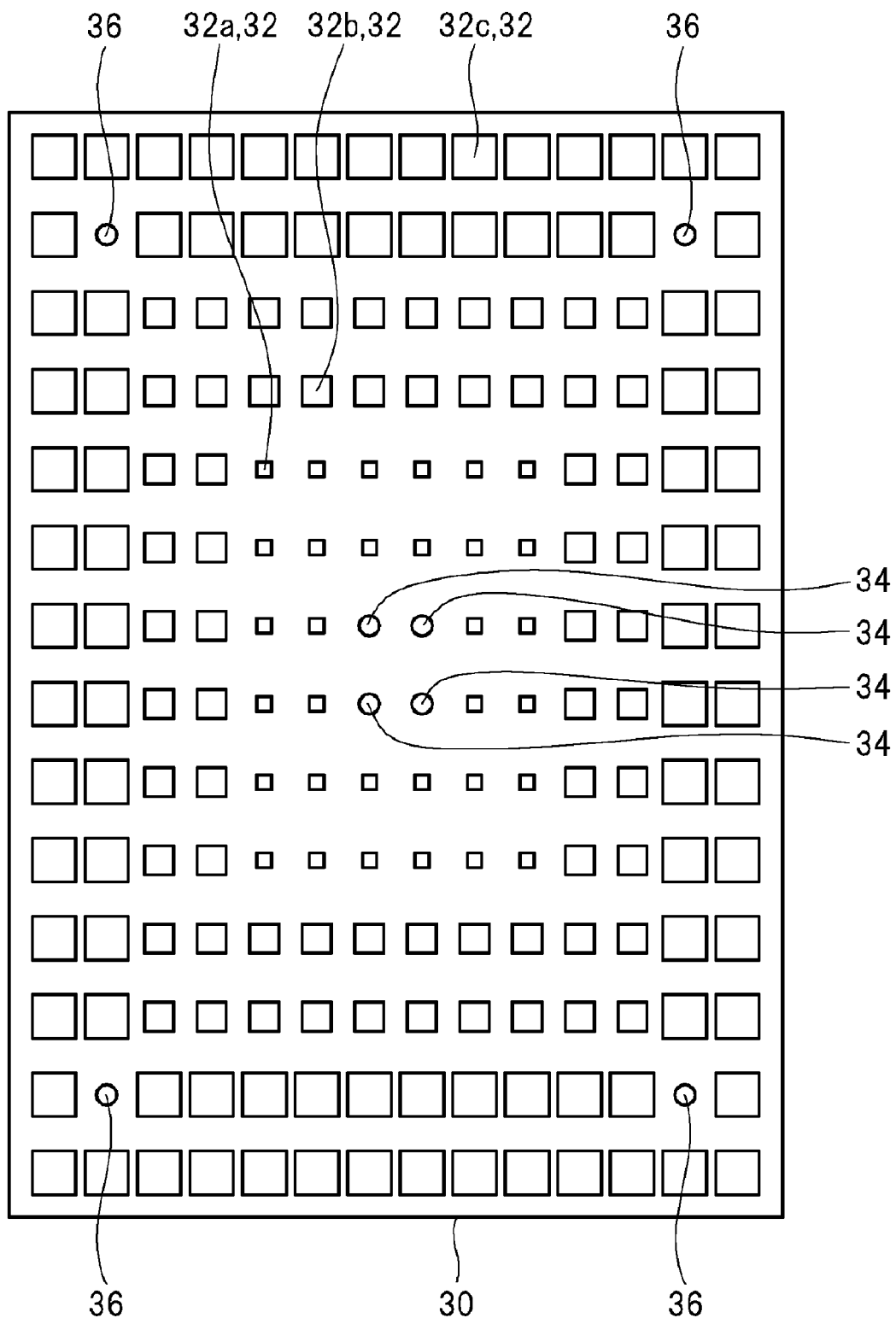
FIG. 4 is a plan view illustrating a reflection sheet of the liquid crystal display apparatus according to the embodiment of the present invention.

FIG. 4 is a plan view illustrating the reflection sheet 30 of the liquid crystal display apparatus according to the embodiment of the present invention. The reflection sheet 30 is made of a material having a coefficient of thermal expansion different from that of the LED substrate 20 (for example, resin such as polyethylene terephthalate, which has a coefficient of thermal expansion greater than that of a glass epoxy resin). Thus, the reflection sheet 30 and the LED substrate 20 expand by different expansion amounts due to heat, resulting in a relative displacement between the reflection sheet 30 and the LED substrate 20.

The reflection sheet 30 includes a plurality of fixing holes 34 formed in a central region of the reflection sheet 30. As illustrated in FIG. 1, the fixing hole 34 is brought into communication with the above-mentioned first through-hole 26 of the LED substrate 20. The reflection sheet 30 includes a plurality of retaining holes 36 formed in an end region of the reflection sheet 30. As illustrated in FIG. 1, the retaining hole 36 is brought into communication with the above-mentioned second through-hole 28 of the LED substrate 20.

As illustrated in FIG. 4, the fixing holes 34 are located in positions closer to the center of the reflection sheet 30 compared to the retaining holes 36. The LED holes 32 which are far from the fixing holes 34 are larger than the LED holes 32 which are close to the fixing holes 34. For example, in FIG. 4, LED holes 32b, which are far from the fixing holes 34, are larger than LED holes 32a, which are close to the fixing holes 34, and LED holes 32c, which are even far from the fixing holes 34, are larger than the LED holes 32b.

The reflection sheet 30 and the LED substrate 20 (also the frame 22, in this embodiment) are fixed to each other by fixing members 38 and retaining members 40. Note that, the fixing member 38 and the retaining member 40 are also of a material and a color which have a light reflecting effect at least on a surface facing in the same direction as the reflection sheet 30. As the fixing member 38 and the retaining member 40, screws and rivets may be used. The fixing member 38 and the retaining member 40 may be fitted in a snap-fit manner. The fixing member 38 and the retaining member 40 extend through the reflection sheet 30 and the LED substrate 20 (also the frame 22, in this embodiment). The fixing member 38 is inserted into the fixing hole 34, and the retaining member 40 is inserted into the retaining hole 36. Further, the frame 22 includes a hole 42 into which the fixing member 38 is inserted and a hole 44 into which the retaining member 40 is inserted.

A clearance between the fixing hole 34 and the fixing member 38 is smaller than a clearance between the retaining hole 36 and the retaining member 40. Thus, retaining of the reflection sheet 30 by the retaining member 40 has, compared to fixing of the reflection sheet 30 by the fixing member 38, a higher degree of freedom of movement in a direction along a surface of the reflection sheet 30. Further, the fixing member 38 is fitted so as to clamp the reflection sheet 30 and the LED substrate 20. Thus, the reflection sheet 30 does not move in a direction away from the LED substrate 20.

On the other hand, the retaining member 40 is fitted so as not to apply any pressing force between the reflection sheet 30 and the LED substrate 20 (for example, so as to allow the reflection sheet 30 and the LED substrate 20 to move away from each other in opposite directions). For example, as illustrated in FIG. 1, the retaining member 40 has a spacing between a first engagement portion 46 on the reflection sheet 30 side and a second engagement portion 48 on the LED substrate 20 side (on the frame 22 side in the example of FIG. 1), and the spacing is larger than a length of the fixing member 38.

According to this embodiment, the fixing member 38 is inserted into the fixing hole 34 so as to fix the reflection sheet 30. Thus, in positions close to the fixing hole 34, because the LED holes 32 are close to the fixing member 38, the displacement amount of the LED holes 32 is small even in the case of expansion and contraction of the reflection sheet 30. Therefore, in positions close to the fixing hole 34 (fixing member 38), the LED holes 32 are relatively small, but the displacement amount of the LED holes 32 is small even in the case of expansion and contraction of the reflection sheet 30. Here, making the LED holes 32 smaller may lead to reduction in exposure of the LED substrate 20 and improved efficiency of the backlight 16. In particular, reduction in luminance of the backlight 16 in the center of the reflection sheet 30 may be prevented. In addition, because the displacement amount of the LED holes 32 is small even in the case of expansion and contraction of the reflection sheet 30, the light emitting diodes 18 are accommodated within the LED holes 32.

On the other hand, in positions far from the fixing hole 34, the retaining member 40 functions not to fix but to retain the reflection sheet 30 so that the reflection sheet 30 may make a parallel movement relative to the LED substrate 20 while following the expansion and contraction of the reflection sheet 30. A portion of the reflection sheet 30, which is retained by the retaining member 40, is far from the fixing member 38, and hence the displacement amount of the LED holes 32 becomes larger in the case of expansion and contraction of the reflection sheet 30. However, the LED holes 32 are relatively large so that the light emitting diodes 18 are not hidden by the reflection sheet 30. Thus, it is possible to prevent reduction in luminance due to the expansion and contraction of the reflection sheet 30.

Figure 5:
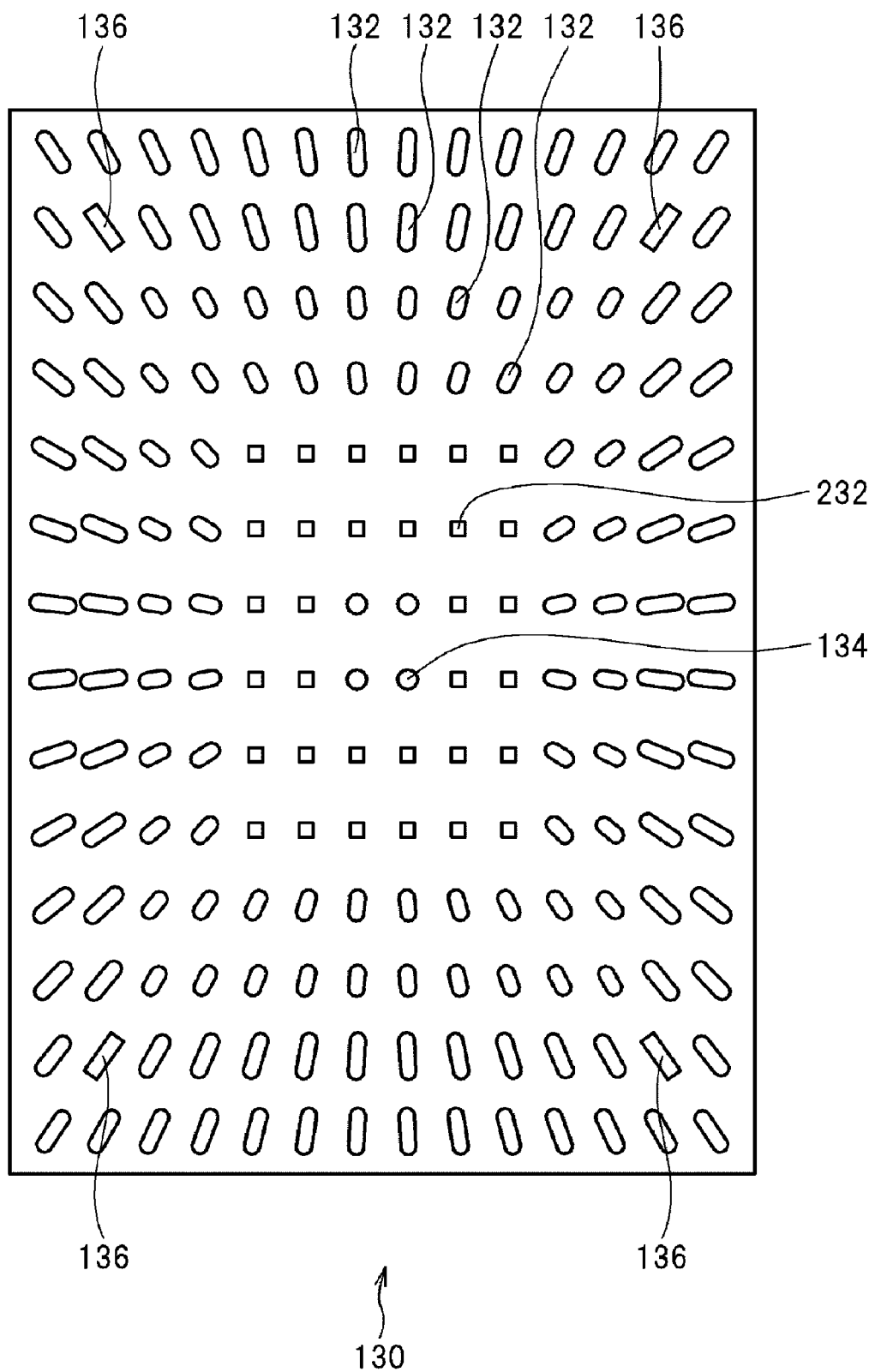
FIG. 5 is a view illustrating a modification of the reflection sheet of the liquid crystal display apparatus according to the embodiment of the present invention.

FIG. 5 is a view illustrating a modification of the reflection sheet of the liquid crystal display apparatus according to the embodiment of the present invention.

In this modification, retaining holes 136 are elongated in a direction of thermal expansion of a reflection sheet 130. A planar shape of the retaining holes 136 may be any of rectangular, oblong, or oval. Because the retaining holes 136 have such a shape, it is possible to allow relative movement between the retaining member 40 (see FIG. 1) and the retaining hole 136 and to make the retaining holes 136 smaller.

In this modification, at least one (all in the example of FIG. 5) LED hole 132 is elongated in the direction of thermal expansion of the reflection sheet 130. A planar shape of the LED holes 132 may be any of rectangular, oblong, or oval. Because the LED holes 132 have such a shape, it is possible to prevent the light emitting diodes 18 (see FIG. 1) from being hidden by the reflection sheet 130 and to make the LED holes 132 smaller.

Note that, in the example illustrated in FIG. 5, fixing holes 134 are not elongated in the direction of thermal expansion of the reflection sheet 130, but the fixing holes 134 may be elongated. Further, LED holes 232, which are close to the fixing holes 134, are not elongated in the direction of thermal expansion of the reflection sheet 130, but the LED holes 232 may be elongated.

The present invention is not limited to the above-mentioned embodiment but various variations may be made. For example, the configuration described in this embodiment may be replaced by a substantially same configuration, a configuration which attains the same effect, and a configuration which may achieve the same object.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display apparatus, comprising:
a liquid crystal display panel;
a plurality of light emitting diodes serving as backlight light sources of the liquid crystal display panel;
an LED substrate on which the plurality of light emitting diodes are mounted;
a reflection sheet made of a material having a coefficient of thermal expansion different from a coefficient of thermal expansion of the LED substrate and overlaid on a surface of the LED substrate on which the plurality of light emitting diodes are mounted; and
a fixing member and a retaining member which extend through the reflection sheet and the LED substrate so as to fix the reflection sheet and the LED substrate to each other, wherein:
the reflection sheet comprises a fixing hole into which the fixing member is inserted, a retaining hole into which the retaining member is inserted, and a plurality of LED holes within which the plurality of light emitting diodes are disposed, respectively;
retaining of the reflection sheet by the retaining member has, compared to fixing of the reflection sheet by the fixing member, a higher degree of freedom of movement in a direction along a surface of the reflection sheet; and
the plurality of LED holes located in positions far from the fixing hole are larger than the plurality of LED holes located in positions close to the fixing hole.

2. The liquid crystal display apparatus according to claim 1, wherein the fixing hole is located in a position closer to a center of the reflection sheet compared to the retaining hole.

3. The liquid crystal display apparatus according to claim 2, wherein:
the fixing hole comprises a plurality of fixing holes, the plurality of fixing holes being formed in a central region of the reflection sheet; and
the retaining hole comprises a plurality of retaining holes, the plurality of retaining holes being formed in an end region of the reflection sheet.

4. The liquid crystal display apparatus according to claim 3, wherein:
the LED substrate is divided into a plurality of divided substrates;
each of the plurality of divided substrates includes a first through-hole brought into communication with the fixing hole and a second through-hole brought into communication with the retaining hole; and
the plurality of divided substrates are arranged so that the first through-holes are close to one another and the second through-holes are apart from one another.

5. The liquid crystal display apparatus according to claim 1, wherein a clearance between the fixing hole and the fixing member is smaller than a clearance between the retaining hole and the retaining member.

6. The liquid crystal display apparatus according to claim 4, wherein a clearance between the fixing hole and the fixing member is smaller than a clearance between the retaining hole and the retaining member.

7. The liquid crystal display apparatus according to claim 1, wherein:
the fixing member is fitted so as to clamp the reflection sheet and the LED substrate; and the retaining member is fitted so as not to apply any pressing force between the reflection sheet and the LED substrate.

8. The liquid crystal display apparatus according to claim 6, wherein:
the fixing member is fitted so as to clamp the reflection sheet and the LED substrate; and
the retaining member is fitted so as not to apply any pressing force between the reflection sheet and the LED substrate.

9. The liquid crystal display apparatus according to claim 1, wherein the retaining hole is elongated in a direction of thermal expansion of the reflection sheet.

10. The liquid crystal display apparatus according to claim 8, wherein the retaining hole is elongated in a direction of thermal expansion of the reflection sheet.

11. The liquid crystal display apparatus according to claim 1, wherein at least one of the plurality of LED holes is elongated in a direction of thermal expansion of the reflection sheet.

12. The liquid crystal display apparatus according to claim 10, wherein at least one of the plurality of LED holes is elongated in the direction of thermal expansion of the reflection sheet.

* * * * *